July 7, 1964  I. J. THERIOT ETAL  3,140,399
PHOTOSENSITIVE VARIABLE FREQUENCY MULTIPLIER
Filed April 3, 1961

LAURIE R. BURROW
IVY J. THERIOT
*INVENTORS*

BY *Walter J. Jason*
   *ATTORNEY*

*Jerome B. Lockwood*
   *AGENT*

United States Patent Office 3,140,399
Patented July 7, 1964

1

3,140,399
PHOTOSENSITIVE VARIABLE FREQUENCY MULTIPLIER
Ivy J. Theriot, Fort Worth, Tex., and Laurie R. Burrow, San Diego, Calif., assignors to General Dynamics Corporation (Convair Division), San Diego, Calif., a corporation of Delaware
Filed Apr. 3, 1961, Ser. No. 100,337
3 Claims. (Cl. 250—233)

This invention relates to electrical frequency multipliers, and more particularly to a variable low frequency multiplier for generating an output frequency that is the product of an input frequency and a selected constant.

An input alternating signal, as from a transducer, is applied to an amplifier, raising the power level. The amplified input signal is employed to drive a synchronous motor. A variable speed drive connected to the motor shaft drives an output shaft at a speed which is a selectable, predetermined multiple of the motor shaft speed. Fastened to the output shaft of the variable speed drive is a light chopper which interrupts a light beam. A photosensitive device responds to the interrupted light beam. Connected to the photosensitive device is an amplifier, providing an output signal which is of a frequency having a predetermined relationship to the input frequency.

It is, therefore, an object of this invention to provide apparatus for producing an output signal having a frequency which is a predetermined multiple of the frequency of an input signal.

Another object of this invention is to provide apparatus for producing an output signal having a frequency which is a variable predetermined multiple of the frequency of an input signal.

Another object of this invention is to provide a variable frequency multiplier adapted to operate at audio and sub-audio frequencies.

Another object of this invention is to provide a variable frequency multiplier which is simple to operate, reliable, accurate and inexpensive.

Figure 1:
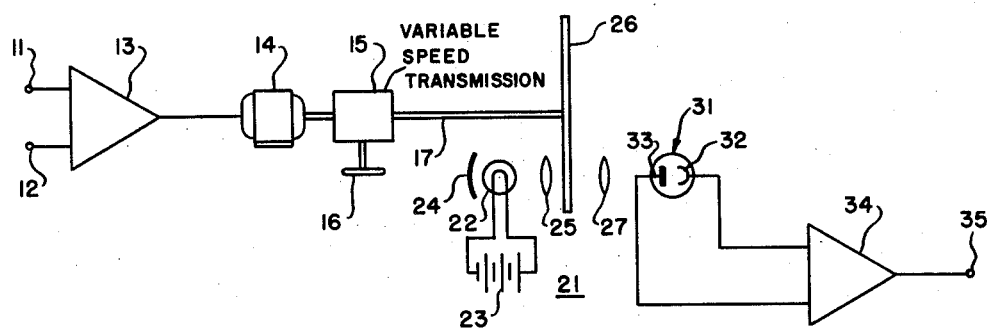
Figure 2:
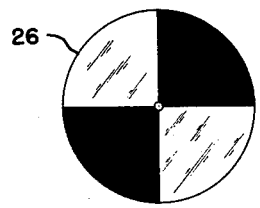

Other objects and advantages of the present invention will become apparent from the following specification and appended drawings, wherein:

FIGURE 1 schematically illustrates the variable frequency multiplier of the present invention; and FIGURE 2 illustrates a light chopper of a type which may be employed in the structure of FIGURE 1.

A suitable input signal is applied to input terminals 11 and 12 of a power amplifier 13. The input signal may be at a very low level, as from a strain gage device, but is amplified in power to provide an output signal sufficient to drive a synchronous motor 14. Synchronous motor 14 may be any of several types of small synchronous motors, such as reluctance or hysteresis torque motors of the type employed in electric clocks, notched pole motors, or conventionally wound synchronous machines. Synchronous motor 14 rotates at a speed proportional to the input frequency by the well known relation $$\frac{120 \times f}{N}$$

wherein $f$ is the input frequency in cycles per second and $N$ is the number of poles in the motor.

A variable speed transmission 15 is connected to the shaft of synchronous motor 14. Variable speed transmission 15 is of a type well known to the art, wherein an output shaft rotates at some multiple of the speed of an input shaft, determined by a suitable control as hand wheel 16. Several types of variable speed drives,

2 which may be employed in connection with this invention, are disclosed on pages 24–72 to 24–81 of Kent's Mechanical Engineers' Handbook, Eleventh Edition, Design, Shop Practice, published by John Wiley and Sons, Inc.

Output shaft 17 has suitably combined therewith an output transducer 21 for generating an electrical signal having a frequency determined by the speed of rotation of shaft 17. In the embodiment of this invention illustrated by FIGURES 1 and 2, output transducer 21 comprises a light source 22 energized by a battery 23, a reflector 24, a condenser lens 25, a light chopper disc 26, a collimating lens 27, and a light sensitive device 31. Light chopper 26, as illustrated by FIGURE 2, includes alternately clear and opaque areas. Exemplarily, the disc 26 may be divided into four quadrants, alternately transparent and opaque.

Light sensitive device 31 may be a conventional photocell, including a photosensitive cathode 32 and an anode 33. An amplifier 34, connected to light sensitive device 31, amplifies the output signal thereof, and serves to eliminate the D.C. component of the output signal. The resulting alternating signal is available at an output terminal 35.

An input signal, which may vary exemplarily, from 10 to 1000 cycles per second, is amplified by power amplifier 13 to a level sufficient to operate synchronous motor 14. Assuming synchronous motor 14 is constructed with two poles, the motor will rotate at a speed of $120f/2$ revolutions per minute, or 60 times the input frequency in cycles per second. Variable speed transmission 15, driven by the output shaft of motor 14, may have the speed ratio between the input and output varied by control 16 over a range of, exemplarily, 0/1 to 1/1. Transducer 21, including disc 26 mounted on output shaft 17 of variable speed transmission 15, produces an output signal at a frequency $N/30$ cycles per second where $N$ is the speed of shaft 17 in revolutions per minute.

It will be apparent, therefore, that the embodiment of the frequency multiplier of the present invention disclosed hereinabove will provide an output signal at a frequency, in cycles per second, of twice the input frequency multiplied by the speed changer ratio. Thus, with an input frequency of 100 cycles per second, the output frequency may be varied from 0 to 200 cycles per second.

While a particular embodiment of this invention is disclosed hereinabove, many changes and modifications may be made without departing from the true spirit and scope of the invention as defined in the appended claims.

We claim:

1. A variable frequency multiplier comprising a synchronous motor for rotating a first shaft at a rate directly proportional to the frequency of an input signal, a second shaft, a variable speed drive driven by said first shaft for selecting a constant speed ratio between said first shaft and said second shaft, a radiation modulator connected to said second shaft, and a radiation source and radiation sensitive means coacting with said radiation modulator, said radiation sensitive means thereby producing an output signal having a frequency at a predetermined multiple of the frequency of said input signal.

2. A variable frequency multiplier comprising a synchronous motor for rotating a first shaft at a rate directly proportional to the frequency of an input signal, a second shaft, a variable speed drive driven by said first shaft for selecting a constant speed ratio between said first shaft and said second shaft, a disc having alternate opaque and transparent areas connected to said second shaft, a light source on one side of said disc and light sensitive means on the opposite side of said disc for producing an output signal having a frequency at a predetermined multiple of the frequency of said input signal.

3. A variable frequency multiplier comprising a power amplifier connected to input terminals, a synchronous motor connected to said power amplifier for rotating a first shaft at a rate directly proportional to the frequency of an input signal, a second shaft, a variable speed drive connected to said first shaft for selecting a constant speed ratio between said first shaft and said second shaft, a disc having alternate opaque and transparent areas connected to said second shaft, a light source on one side of said disc, light sensitive means on the opposite side of said disc, and an amplifier connected to said light sensitive means, thereby producing an output signal having a frequency at a predetermined multiple of the frequency of said input signal.

References Cited in the file of this patent
UNITED STATES PATENTS

| | | |
|---|---|---|
| 1,909,103 | Griebach | May 16, 1933 |
| 1,910,540 | Hammond | May 23, 1933 |
| 2,725,487 | Butler et al. | Nov. 29, 1955 |
| 2,944,158 | Brown | July 5, 1960 |